US012223806B2

(12) United States Patent
Komaki et al.

(10) Patent No.: US 12,223,806 B2
(45) Date of Patent: Feb. 11, 2025

(54) INFORMATION PROCESSING APPARATUS, INFORMATION PROCESSING METHOD, AND INFORMATION PROCESSING SYSTEM

(71) Applicant: mixi, Inc., Tokyo (JP)

(72) Inventors: Nobutaka Komaki, Tokyo (JP); Kosuke Kuriyama, Tokyo (JP); Masanori Matsumoto, Tokyo (JP)

(73) Assignee: mixi, Inc., Tokyo (JP)

( * ) Notice: Subject to any disclaimer, the term of this patent is extended or adjusted under 35 U.S.C. 154(b) by 217 days.

(21) Appl. No.: 17/696,864

(22) Filed: Mar. 17, 2022

(65) Prior Publication Data

US 2022/0207965 A1 Jun. 30, 2022

Related U.S. Application Data

(63) Continuation of application No. PCT/JP2021/007089, filed on Feb. 25, 2021.

(30) Foreign Application Priority Data

Mar. 11, 2020 (JP) ................................ 2020-042385

(51) Int. Cl.
*G07F 17/32* (2006.01)

(52) U.S. Cl.
CPC ...... *G07F 17/3288* (2013.01); *G07F 17/3223* (2013.01)

(58) Field of Classification Search
CPC . G07F 17/3288; G07F 17/3223; G07F 17/323
See application file for complete search history.

(56) References Cited

U.S. PATENT DOCUMENTS

2016/0189483 A1* 6/2016 Ballman ............. G07F 17/3258 463/28
2017/0017657 A1* 1/2017 English ............... G07F 17/3211
2019/0221080 A1* 7/2019 Reetz .................. G07F 17/3223
2020/0043297 A1* 2/2020 Foelsch .................. G07F 17/42
(Continued)

FOREIGN PATENT DOCUMENTS

GB 2466456 A 6/2010
JP 2007193715 A 8/2007
(Continued)

OTHER PUBLICATIONS

Extended European Search Report in EP Application No. 21768839.9 mailed Sep. 29, 2022, 11pp.
(Continued)

*Primary Examiner* — James S. McClellan
*Assistant Examiner* — Ross A Williams
(74) *Attorney, Agent, or Firm* — HAUPTMAN HAM, LLP

(57) ABSTRACT

An information processing apparatus which accepts a bet for a competition in which a bet can be placed on a betting target includes a processor configured to execute a process including: accepting a designation of a betting target for the competition from a first player, selecting a second player who places a bet on the same betting target as the betting target designated by the first player from among a plurality of second players who predict outcomes of the competition, and displaying information indicating the second player selected in the selecting on a terminal of the first player.

8 Claims, 6 Drawing Sheets

(56) References Cited

U.S. PATENT DOCUMENTS

2021/0074127 A1 * 3/2021 Fleck .................. G07F 17/3269
2021/0327221 A1 10/2021 Matsui et al.

FOREIGN PATENT DOCUMENTS

JP 2010160612 A 7/2010
JP 201345412 A 3/2013
JP 2013114487 A 6/2013
WO WO-2008039966 A2 * 4/2008 ........... A63F 3/0434
WO 2020036210 A1 2/2020

OTHER PUBLICATIONS

International Search Report in PCT Application No. PCT/JP2021/007089 mailed May 11, 2021, 2pp.

* cited by examiner

| TIPSTER | BETTING TARGET | | NUMBER OF SELECTORS | NUMBER OF VIEWERS |
|---|---|---|---|---|
| | BETTING TYPE | PREDICTED WINNER | | |
| A | QUINELLA | 2−3 | 190 | 3121 |
| | QUINELLA | 2−5 | 251 | |
| B | QUINELLA | 2−5 | 45 | 891 |
| | QUINELLA | 3−5 | 67 | |
| C | TRIFECTA | 5→3→2 | 21 | 766 |
| | PERFECTA | 5→2 | 37 | |
| | QUINELLA | 2−5 | 130 | |
| D | QUINELLA | 2−5 | 25 | 114 |
| | QUINELLA | 2−9 | 14 | |
| ... | ... | ... | ... | ... |

INFORMATION PROCESSING APPARATUS, INFORMATION PROCESSING METHOD, AND INFORMATION PROCESSING SYSTEM

CROSS-REFERENCE TO RELATED APPLICATIONS

The present application is a continuation application of International Application number PCT/JP2021/007089, filed on Feb. 25, 2021, which claims priority under 35 U.S.C. § 119(a) to Japanese Patent Application No. 2020-042385, filed on Mar. 11, 2020. The contents of these applications are incorporated herein by reference in their entirety.

BACKGROUND OF THE INVENTION

The present invention relates to an information processing apparatus, an information processing method, and an information processing system.

A system is known in which a bet (vote) can be placed from a portable device on various competitions, such as a horse race, a motorboat race, or the like. Japanese Unexamined Patent Application Publication No. 2013-114487 discloses a system in which a bettor can purchase a betting ticket using a portable device.

Among bettors who have little experience in betting, there are some bettors who hesitate to place their bets because they are not confident about their own predictions. Therefore, it is required to encourage a bettor to place a bet.

BRIEF SUMMARY OF THE INVENTION

The present disclosure focuses on this point, and its object is to encourage a bettor to place a bet.

An information processing apparatus according to a first aspect of the present disclosure includes a processor configured to execute a process including, accepting a designation of a betting target for the competition from a first player; selecting that selects a second player who places a bet on the same betting target as the betting target designated by the first player from among a plurality of second players who predict outcomes of the competition; and displaying information indicating the second player selected in the selecting on a terminal of the first player.

An information processing method according to a second aspect of the present disclosure is an information processing method that is executed by a computer which accepts a bet for the competition in which a bet can be placed on the betting target, including: accepting a designation of a betting target for a competition from a first player; selecting a second player who places a bet on the same betting target as the betting target designated by the first player from among a plurality of second players who predict outcomes of the competition; and displaying information indicating the selected second player on a terminal of the first player.

An information processing system according to a third aspect of the present disclosure includes an information processing apparatus which accepts a bet for a competition in which a bet can be placed on a betting target, and a terminal for placing a bet for the betting target, wherein the information processing apparatus has a processor configured to execute a process including accepting a designation of a betting target for the competition from the terminal which a first player uses; selecting a second player who places a bet on the same betting target as the betting target designated by the first player from among a plurality of second players who predict outcomes of the competition; and displaying information indicating the second player selected in the selecting on the terminal which the first player uses.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<System Configuration>

Figure 1:
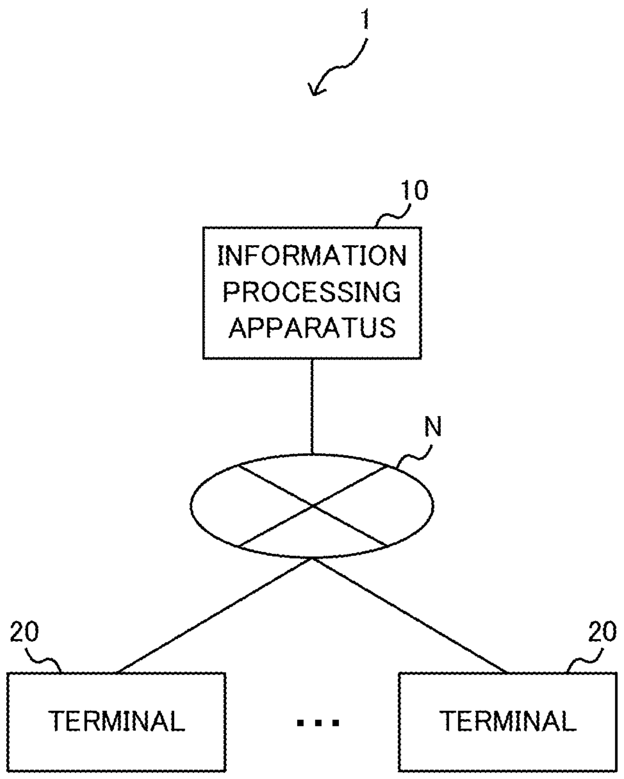
FIG. 1 shows an example of a system configuration of a betting system according to the present embodiment.

FIG. 1 shows an example of a system configuration of a betting system 1 according to the present embodiment. The betting system 1 shown in FIG. 1 includes an information processing apparatus 10 and one or more terminals 20. The information processing apparatus 10 and the terminal 20 are connected to each other in a manner enabling communications via a communication network N such as the Internet, an intranet, a wireless LAN, or a mobile communication network.

The information processing apparatus 10 is an apparatus that accepts a bet for a competition in which a bet can be placed on a betting target. Specifically, the information processing apparatus 10 is an apparatus for supporting a bettor who uses the terminal 20 to bet, in a competition such as a bicycle race, a horse race, or a motorboat race, a predetermined value on a contestant (including an animal or player) who is expected to win the competition.

The bettor may place a bet by determining a betting target defined by a combination of (i) a betting type (i.e., wager type) and (ii) a plurality of contestants or starting gate numbers corresponding to the plurality of contestants expected to win a competition, and by setting (i) the determined betting target and (ii) a predetermined value of the number of bets or a wager amount for the betting target to the terminal 20. In a case where a bicycle race is the competition to be the object of betting, the betting target is “a perfecta, in which the contestant number 5 comes in first and the contestant number 2 comes in second,” or “a trio, in which the contestant number 1, the contestant number 2, and the contestant number 5 are chosen," for example. Note that the perfecta is to predict two contestants who come in the first and second places in exact order, and the trio is to predict three contestants who come in the first, second and third places in any order.

The predetermined value may be (i) money or (ii) points or the like which are usable in predetermined services or games. Also, the points may be points that can be received by the bettor for free (free points), or points that can be received in exchange for payment of money (chargeable points).

The information processing apparatus 10 includes one or a plurality of physical servers. The information processing apparatus 10 may be configured using a virtual server operating on a hypervisor or may be configured using a cloud server, for example.

The terminal 20 is a terminal used by a bettor who places a bet, and is an information processing terminal such as a cell phone (including a smartphone), a tablet terminal, or a personal computer, for example. The bettor can bet on the betting target by operating the terminal 20. Upon accepting an input of the betting target from the bettor, the terminal 20 transmits information indicating the betting target to the information processing apparatus 10 in association with bettor identification information (hereinafter referred to as a "bettor ID") for identifying the bettor who uses the terminal 20.

The information processing apparatus 10 executes a process of storing the betting target bet on by the bettor who uses the terminal 20, a process of storing the magnitude of a value owned by the bettor, a process of determining a reward amount (i.e., a payout) according to a result of a competition, and the like.

Among bettors who are beginner bettors and serving as first players, there are some bettors who hesitate to place their bets because they are not confident about their own predictions. Therefore, when the information processing apparatus 10 accepts a designation of a betting target for a competition from a bettor, the information processing apparatus 10 causes the terminal 20 to display information indicating a tipster who placed a bet on the same betting target as the betting target designated by the bettor, among a plurality of tipsters serving as a plurality of second players who predict outcomes of the competition. The tipster is a sharp bettor who has significant experience in betting on the competition or a bettor who has abundant knowledge of the contestants, for example, and is registered in advance in the information processing apparatus 10. The tipster may be some bettors among a plurality of bettors, or may be a person who only makes predictions without placing any bet.

By operating in this manner, the information processing apparatus 10 can have the bettor perceive that the tipster is betting on the betting target designated by the bettor, and make the bettor feel confident about his/her predictions. Therefore, the information processing apparatus 10 can encourage the bettor to place a bet. Next, configurations and operations of the information processing apparatus 10 and the terminal 20 will be described in detail.

<Hardware Configuration>

Figure 2:
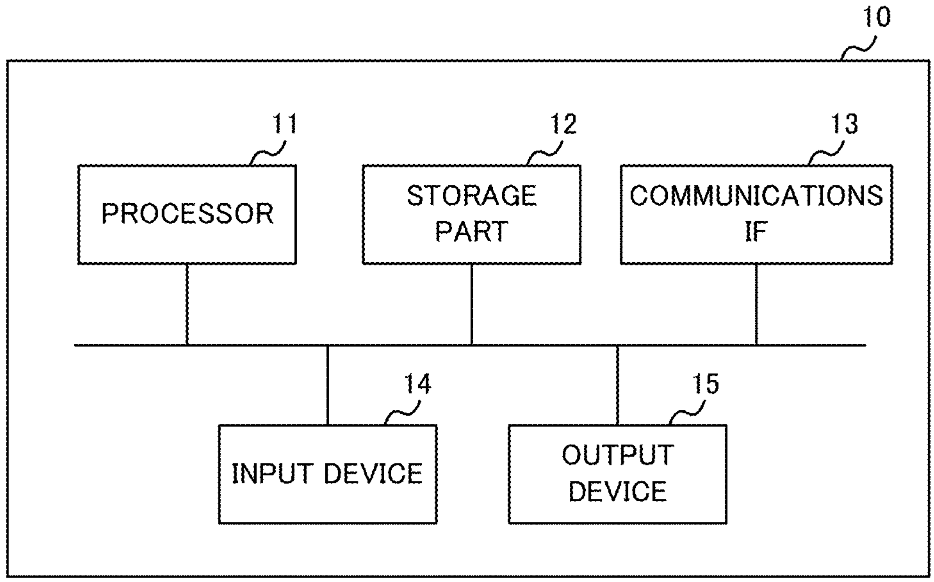
FIG. 2 shows an example of a hardware configuration of an information processing apparatus.

FIG. 2 shows an example of a hardware configuration of the information processing apparatus 10. The information processing apparatus 10 includes a processor 11, a storage part 12, a communications interface (IF) 13, an input device 14, and an output device 15.

The processor 11 is a central processing unit (CPU) or a graphical processing unit (GPU), and realizes various functions by executing a program stored in the storage part 12, for example.

The storage part 12 includes a storage medium such as a memory, a hard disk drive (HDD), or a solid state drive (SSD). The storage part 12 stores the program executed by the processor 11. The storage part 12 stores, in association with the bettor ID, the betting target, a bet amount (i.e., a wager amount), and the like that are selected by the bettor. Further, the storage part 12 stores a betting target table including information in which (i) a plurality of tipsters who placed their bets on a competition and (ii) betting targets bet on by the respective tipsters are associated with each other.

Figures 3, 4:
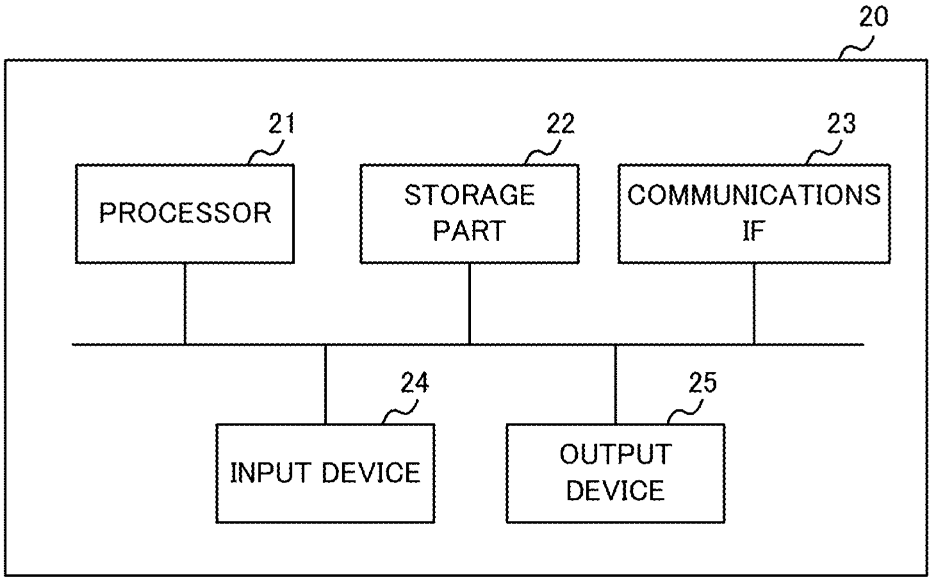
FIG. 3 shows an example of a betting target table.
FIG. 4 shows an example of a hardware configuration of a terminal.

FIG. 3 shows an example of the betting target table. In the betting target table shown in FIG. 3, (i) tipster names, (ii) betting types, (iii) betting targets bet on by the tipsters, (iv) the number of bettors (that is, the number of selectors) selecting each predicted betting target, and (v) the number of bettors (that is, the number of viewers) watching a video streamed by a tipster are associated with each other. The "betting target" is a combination of the betting type and a predicted winner corresponding to the betting target already bet on by the tipster, for example.

The communications IF 13 includes a communication controller that communicates with the terminal 20 wirelessly or by wire, via the communication network N. The communications IF 13 provides notification of data received from the terminal 20 to the processor 11. The communications IF 13 transmits the data input from the processor 11 to the terminal 20.

The input device 14 accepts an input operation from an administrator of the information processing apparatus 10, for example. The input device 14 is a keyboard, a touch panel, a mouse, or a microphone, for example. The output device 15 outputs information to the administrator of the information processing apparatus 10, for example. The output device 15 is a display, a speaker, or the like, for example.

FIG. 4 shows an example of a hardware configuration of the terminal 20. The terminal 20 includes a processor 21, a storage part 22, a communications IF 23, an input device 24, and an output device 25.

The processor 21 is a CPU, for example, and realizes various functions by executing a program stored in the storage part 22.

The storage part 22 includes a storage medium such as a read only memory (ROM), a random access memory (RAM), or the like. The storage part 22 stores the program executed by the processor 21.

The communications IF 23 includes a communication controller that communicates with the information processing apparatus 10 wirelessly or by wire via the communication network N. The communications IF 23 provides notification of data received from the information processing apparatus 10 to the processor 21. The communications IF 23 transmits the data input from the processor 21 to the information processing apparatus 10.

The input device 24 accepts an input operation from the bettor, for example. The input device 24 is a keyboard, a touch panel, a mouse, or a microphone for example. The output device 25 outputs information to the bettor, for example. The output device 25 is a display or a speaker, for example.

<Functional Configuration>

Figure 5:
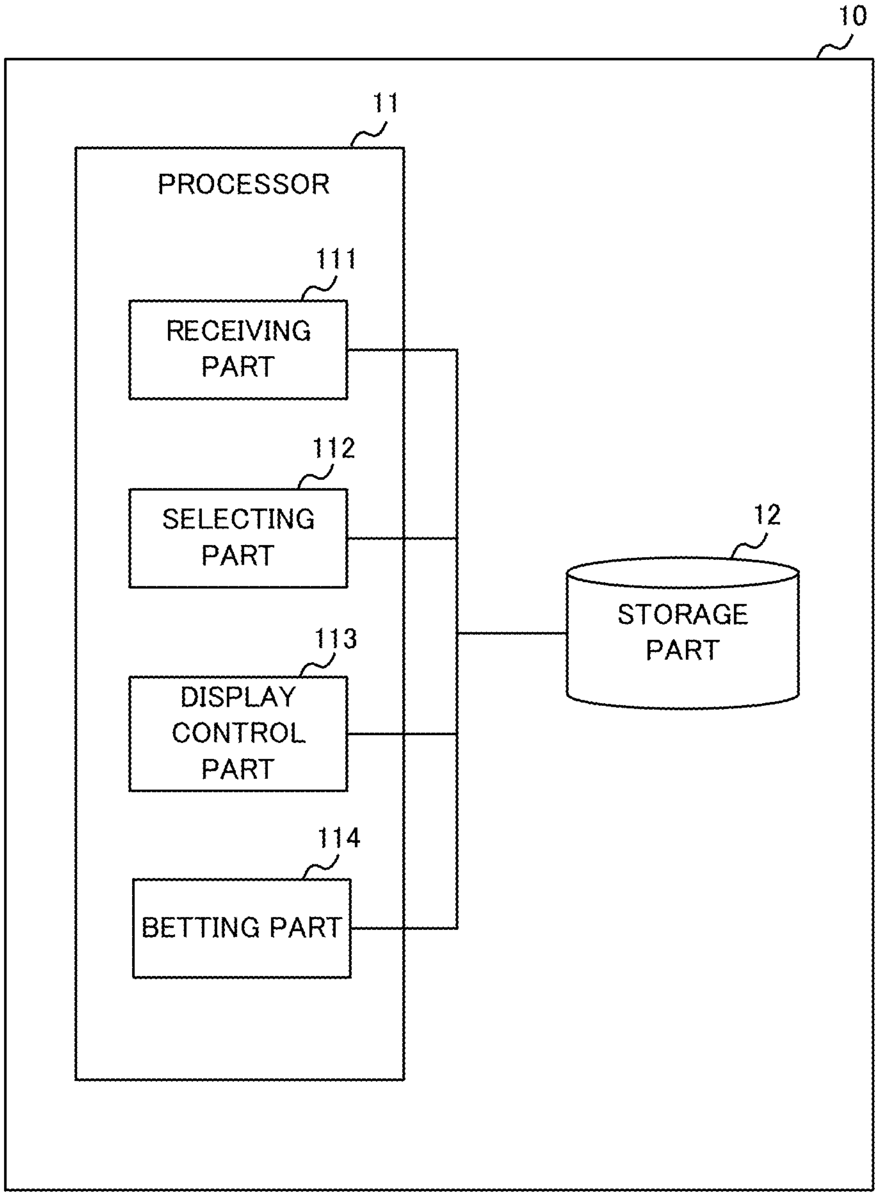
FIG. 5 shows a functional block configuration example of a processor.

FIG. 5 shows a functional block configuration example of a processor 11. The processor 11 includes an accepting part 111, a selecting part 112, a display control part 113, and a betting part 114. The processor 11 functions as the accepting part 111, the selecting part 112, the display control part 113, and the betting part 114 by executing a program stored in the storage part 12.

Figure 6:
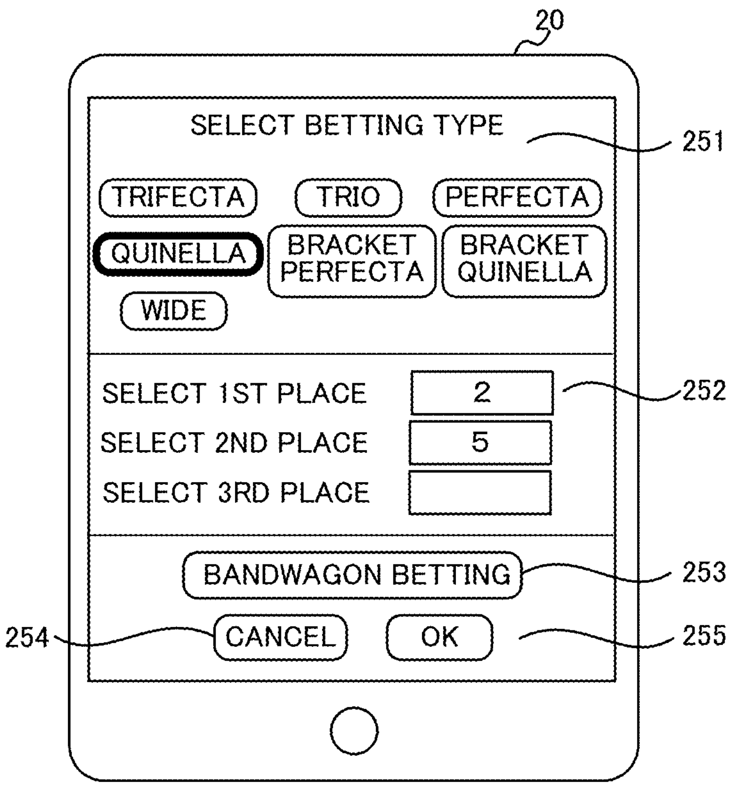
FIG. 6 is an example of a screen to be displayed on the terminal on which application software for betting is launched.
Figure 7:
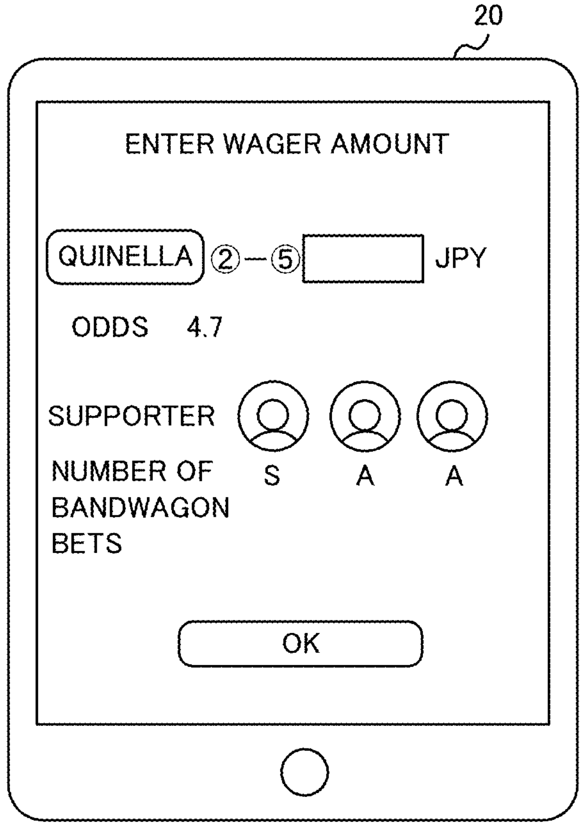
FIG. 7 is an example of a wager amount entry screen to be displayed on the terminal when a bettor designates a betting target by himself/herself.

The accepting part 111 accepts a designation of a betting target for a competition from a bettor. FIGS. 6 and 7 each show an example of a screen to be displayed on the terminal 20 by the accepting part 111. FIG. 6 is an example of a screen to be displayed on the terminal 20 on which application software for betting is launched.

The screen shown in FIG. 6 shows an area 251 for selecting a betting type, an area 252 for designating a betting target, an operation image 253 for selecting bandwagon betting, an operation image 254 for a cancellation operation, and an operation image 255 for a confirmation operation.

The bandwagon betting is a method of betting on the same or at least partially the same betting target designated by a tipster selected by the bettor. The bettor can place the bandwagon bet by selecting a "bandwagon betting" button of the operation image 253 and then selecting an "OK" button of the operation image 255, without operating the area 251 and the area 252. The terminal 20 transmits (i) selection information indicating the tipster selected by the bettor, (ii) a betting instruction for a betting target that is at least partially the same as the betting target designated by the selected tipster (that is, a bandwagon-betting instruction for the bettor to place a bandwagon bet on the selected tipster), and (iii) the wager amount to the information processing apparatus 10.

The accepting part 111 acquires the selection information, the bandwagon-betting instruction for the bettor to place the bandwagon bet on the selected tipster, and the wager amount transmitted by the terminal 20. Upon acquiring the bandwagon-betting instruction, the accepting part 111 adds "1" to the number of selectors associated with the selected tipster indicated by the selection information in the betting target table stored in the storage part 12. It should be noted that the processor 11 may function as a benefit giving part and give, to the bettor who placed the bandwagon bet, a bonus benefit depending on a value (amount of money or free points) that he/she has bet. Further, if the bandwagon betting is a win, the processor 11 may give the bonus benefit according to the payout. Bonus benefits may include free gifts, free points, and cashback. This increases a possibility that the bettor will place the bandwagon bet because of the bonus benefits, and consequently the information processing apparatus 10 can promote the bandwagon betting.

On the other hand, when the bettor wishes to place a bet by designating a betting target by himself/herself, the bettor may designate his/her betting target by selecting a betting type in the area 251, entering the contestant number or the starting gate number in the area 252, and selecting an "OK" button of the operation image 255. When the bettor designates his/her betting target, the terminal 20 transmits the bettor ID of the bettor and the betting target including the combination of the betting type and the contestant selected by the bettor to the information processing apparatus 10. By acquiring the bettor ID of the bettor and the betting target from the terminal 20, the accepting part 111 accepts the designation of the betting target for the competition from the bettor.

In the example shown in FIG. 6, it can be confirmed that the bettor has selected "quinella" as the betting type, and has selected the contestant number 2 and the contestant number 5 as contestants who come in first place to third place. In the example shown in FIG. 6, the accepting part 111 accepts the designation of the betting target for the competition from the bettor by receiving (i) the bettor ID of the bettor and (ii) the betting type "quinella" and the combination of contestants "2 and 5," as the betting target, from the terminal 20.

The selecting part 112 selects, from among the plurality of tipsters who predict outcomes of the competition, a tipster who placed a bet on the same betting target as the betting target designated by the bettor. More specifically, when the accepting part 111 accepts the designation of the betting target from the bettor, the selecting part 112 references the betting target table and selects the tipster who placed the bet on the same betting target as the designated betting target.

When the accepting part 111 accepts the designation of the betting type "quinella" and the combination of contestants "2 and 5," as the betting target for the competition, from the bettor, the selecting part 112 references the betting target table and selects a tipster A to a tipster D as the tipsters who placed their bets on the same betting target as the designated betting target.

If there are a plurality of tipsters who placed their bets on the same betting target as the betting target designated by the bettor, the selecting part 112 may narrow down the tipsters to be selected. For example, if there are more tipsters who placed their bets on the same betting target as the betting target designated by the bettor than a maximum number of tipsters presentable to a bettor, the selecting part 112 may prioritize and select (i) a tipster with a larger number of other bettors (that is, bettors who placed the bandwagon bet) who placed their bets on the basis of the bet of said tipster over (ii) a tipster with a smaller number of other bettors who placed their bets on the basis of the bet of said tipster.

The maximum number of tipsters to be presented is a number greater than or equal to one, for example, and is 3, for example. In a case where the accepting part 111 accepts the designation of the betting type "quinella" and the combination of contestants "2 and 5" as the betting target for the competition from the bettor, there are four tipsters who placed their bets on the same betting target as the designated betting target, who are the tipsters A to D in the example shown in FIG. 3. The selecting part 112 references the betting target table and identifies the number of selectors associated with the betting type "quinella" and the combination of contestants "2 and 5". The selecting part 112 identifies the number of selectors associated with the tipsters A to D's betting type "quinella" and the combination of contestants "2 and 5" as "251," "45," "130," and "25," respectively. The selecting part 112 selects three tipsters A, B, and C with a larger number of selectors.

Further, the selecting part 112 may select, from among the tipsters who placed their bets on the same betting target as the betting target designated by the bettor, a tipster for whom the number of other bettors who place their bets on the basis of the bet of said tipster is equal to or more than a predetermined number. By doing this, the selecting part 112 can prevent selecting of a tipster to whom almost no bandwagon bets are placed.

The display control part 113 causes the bettor's terminal 20 to display information indicating the tipster selected by the selecting part 112. Specifically, the display control part 113 causes the terminal 20 to display (i) information indicating the betting target for which the accepting part 111 has accepted the designation from the bettor, (ii) the information indicating the tipster selected by the selecting part 112, and (iii) the information indicating that the tipster selected by the selecting part 112 placed the same bet as the bettor, in association with each other.

FIG. 7 is an example of a wager amount entry screen to be displayed on the terminal 20 when the bettor designates the betting target by himself/herself. In the example shown in FIG. 7, the betting type “quinella” and the combination of contestants “2 and 5,” which is the betting target designated by the bettor in FIG. 6, are displayed, and a wager amount entry field and odds are displayed in association with each other. In the example shown in FIG. 7, an indication “Supporter,” as the information indicating that the tipster selected by the selecting part 112 placed the same bet as the bettor, and three icons corresponding to the tipsters A to C are displayed.

Further, “Number of bandwagon bets” is displayed in the example shown in FIG. 7, and it can be confirmed that symbols “S” and “A” are displayed as information indicating how large the number of selectors associated with the betting target of the tipster is. In the present embodiment, symbols “S”, “A”, “B,” and “C” are displayed in descending order of the number of selectors. By doing this, the information processing apparatus 10 can make the bettor feel confident about oneself by having the bettor recognize that his/her betting contents match the betting contents of the tipster who is supported by many users.

It should be noted that the screen for accepting an entry of a wager amount for a betting target is to be displayed in response to the acceptance of one betting target by the accepting part 111 as shown in FIG. 7, but it is not limited to this. For example, the accepting part 111 may further accept a selection of a betting target after accepting the one betting target. After the accepting part 111 has accepted a plurality of betting targets, it may accept an entry of wager amounts in a lump sum.

When the accepting part 111 accepts the plurality of betting targets, the selecting part 112 selects one betting target from among the plurality of betting targets, and selects a tipster who placed a bet on the same betting target as the selected betting target. For example, it is assumed that the betting target designated by the accepting part 111 includes a first betting target and a second betting target. In this case, the selecting part 112 selects a betting target to be used when the tipster is selected on the basis of a predetermined condition from the first betting target and the second betting target. The predetermined condition is, for example, (i) a range of odds, (ii) a bet amount of a bettor, or (iii) a winnability of each betting type. For example, the selecting part 112 selects a betting target with higher odds among the first betting target and the second betting target. Then, the selecting part 112 selects a tipster who placed the bet on the same betting target as the selected betting target.

Figure 8:
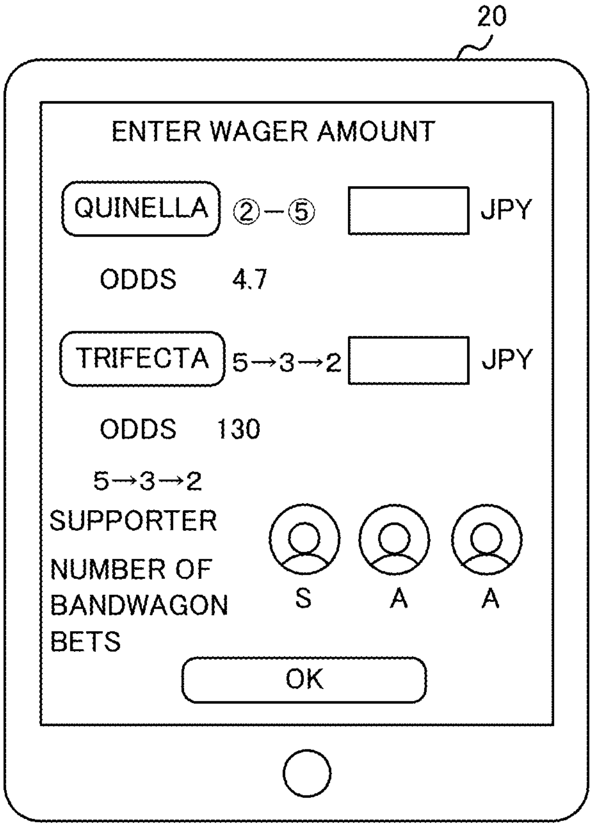
FIG. 8 is an example of a wager amount entry screen to be displayed on the terminal when the bettor designates a plurality of betting targets.

FIG. 8 is an example of a wager amount entry screen to be displayed on the terminal 20 when the bettor designates the plurality of betting targets. In the example shown in FIG. 8, it can be confirmed that a wager amount entry field for each of the plurality of betting targets and odds are displayed in association with each other. Typically, the higher the odds of the betting target, the more difficult it is for the bettor to place his/her bet with confidence. In the example shown in FIG. 8, it can be confirmed that the icon of the tipster who placed the bet on a combination of contestants “5→3→2” with high odds is displayed. By doing this, the bettor can place his/her bet at ease with confidence in his/her betting target because he/she has confirmed that there is the tipster who placed the bet on the betting target with high odds, which the bettor selected by himself/herself.

Further, the display control part 113 displays the plurality of betting targets and the tipster who placed the bet on at least one of the plurality of betting targets on one screen. By doing this, if the bettor places his/her bets on the plurality of betting targets, the bettor can confirm the tipsters who placed their bets on the same betting targets while viewing his/her own plurality of betting targets. Therefore, since the bettor does not need to switch the screen for each betting target, the bettor’s operability improves and power consumption of the terminal 20 is reduced by decreasing the operation time of the terminal 20.

The selecting part 112 selects one betting target from the plurality of betting targets, and selects the tipster who placed the bet on the same betting target as the selected betting target, but it is not limited to this. The selecting part 112 may select, from among the plurality of tipsters, a tipster who placed a bet on all of the plurality of betting targets designated by the bettor.

As shown in FIG. 7, the display control part 113 displays a symbol as the information indicating how large the number of selectors associated with the betting target of the tipster is, but it is not limited to this. The display control part 113 may display the number of selectors associated with the betting target of the tipster instead of the symbol.

Further, in the example shown in FIG. 7, from among the tipsters who placed the same betting target as the betting target designated by the bettor, the tipster with a larger number of selectors, i.e., the tipster with a larger number of the bettors who placed the bandwagon bets, is displayed, but it is not limited to this. If there are a plurality of tipsters who placed their bets on the same betting target as the betting target designated by the bettor, the selecting part 112 may prioritize and select a tipster with a better win rate record over a tipster with a poorer win rate record.

In this case, the storage part 12 stores a result table including information in which (i) a plurality of tipsters who placed their bets on a competition and (ii) win rate records of the respective tipsters are associated with each other. If there are more tipsters who placed their bets on the same betting target as the betting target designated by the bettor than the maximum number of tipsters to be presented, the selecting part 112 preferentially selects, from among these tipsters, the maximum number of tipsters to be presented who each have a good win rate result, by referencing the result table. The display control part 113 causes the terminal 20 of the bettor to display information indicating the tipsters selected by the selecting part 112 and information corresponding to the win rate records of the tipsters.

Figure 9:
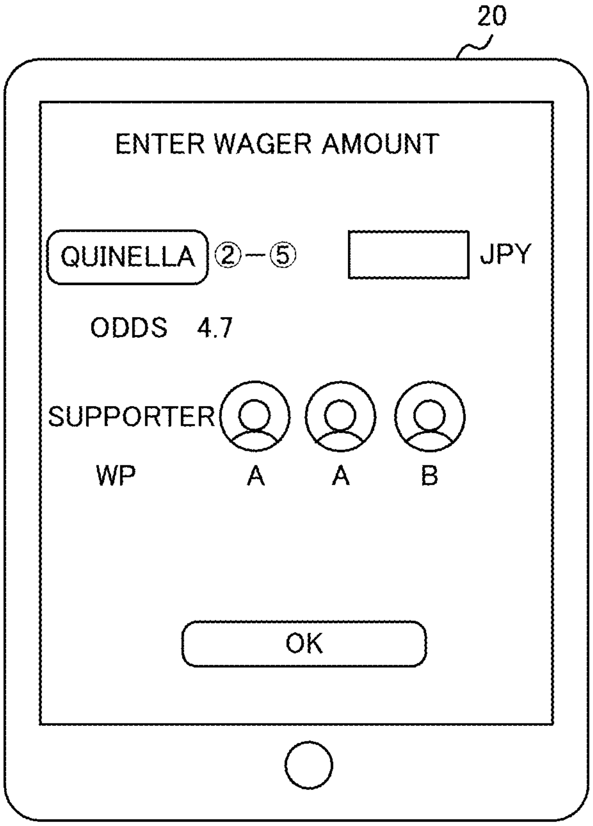
FIG. 9 is another example of the wager amount entry screen to be displayed on the terminal when the bettor designates a betting target by himself/herself.

FIG. 9 is another example of the wager amount entry screen to be displayed on the terminal 20 when the bettor designates the betting target by himself/herself. In the example shown in FIG. 9, similar to FIG. 7, the betting type “quinella” and the combination of contestants “2 and 5,” which is the betting target designated by the bettor, are displayed, and the wager amount entry field and odds are displayed in association with each other. Further, in the example shown in FIG. 9, it can be confirmed that three icons indicating three tipsters and “winning percentage (WP)” are displayed together with symbols “A” and “B” indicating how high the win rate of a tipster is. In the present embodiment, symbols “S”, “A”, “B,” and “C” are displayed in descending order of a prediction win rate. By doing this, the information processing apparatus 10 can encourage the bettor by having the bettor recognize that his/her betting contents match the betting contents of the tipster who has a high prediction win rate.

As shown in FIG. 9, the display control part 113 displays the symbol as information indicating the prediction win rate of the tipster, but it is not limited to this. The display control part 113 may display the prediction win rate of the tipster instead of the symbol. In addition, the display control part 113 may display the wager amount for each betting target of one or more tipsters. Further, the display control part 113 may display statistical information of the wager amount for the betting target of one or more tipsters. The statistical information of the wager amount is, for example, an average value, a maximum value, a minimum value, or the like of the wager amount. The bettor can check the wager amount of the tipster and use it as a reference when determining his/her wager amount.

If there are a plurality of tipsters who placed their bets on the same betting target as the betting target designated by the bettor, the selecting part 112 may prioritize and select (i) a tipster with a large number of other bettors viewing information about said tipster's prediction over (ii) a tipster with a small number of other bettors viewing information about said tipster's prediction.

More specifically, if there are more tipsters who placed their bets on the same betting target as the betting target designated by the bettor than the maximum number of tipsters to be presented, the selecting part 112 references the number of viewers in the betting target table, and prioritizes and selects (i) the maximum number of tipsters to be presented who each have a larger number of viewers of a video streamed by the tipster over (ii) a tipster who has a smaller number of viewers of the video. The display control part 113 causes the terminal 20 of the bettor to display the information indicating the tipster selected by the selecting part 112 and the information corresponding to the prediction win rate of the tipster.

In this way, the information processing apparatus 10 can have the bettor recognize that his/her betting contents match the betting contents of the highly popular tipster who is viewed by many bettors. This makes it easier for the bettor to place a bet since he/she has confidence in his/her own bet.

In the screens shown in FIGS. 7 to 9, the bettor enters a wager amount corresponding to the betting target designated by himself/herself. When the bettor enters the wager amount and then touches the "OK" button, the terminal 20 transmits the bettor ID, a betting instruction for the betting target designated by the bettor, and the wager amount to the information processing apparatus 10.

The accepting part 111 may display a screen for accepting bandwagon betting on the display screens shown in FIG. 7 to FIG. 9 to accept a selection of tipsters for bandwagon betting so that the bettor can place a bandwagon bet. In this case, when the bettor touches the "OK" button in a state where the tipster is tapped and selected on the display screens shown in FIG. 7 to FIG. 9, the terminal 20 displays the screen for accepting the bandwagon betting and accepts the bandwagon bet from the bettor. The terminal 20 may display a message that the bandwagon betting can be placed on the display screens shown in FIG. 7 to FIG. 9. By doing this, the bettor can place the bandwagon bet on a tipster who is placing a bet that is similar to his/her own prediction.

The betting part 114 accepts a betting instruction of the bettor for a competition by receiving, from the terminal 20 of the bettor, (i) the bettor ID, a betting instruction for placing a bet on the betting target in the competition, and (iii) the wager amount. The betting part 114 executes a bet of the bettor for the competition according to the betting instruction.

<Processing Flow of the Information Processing Apparatus 10>

Figure 10:
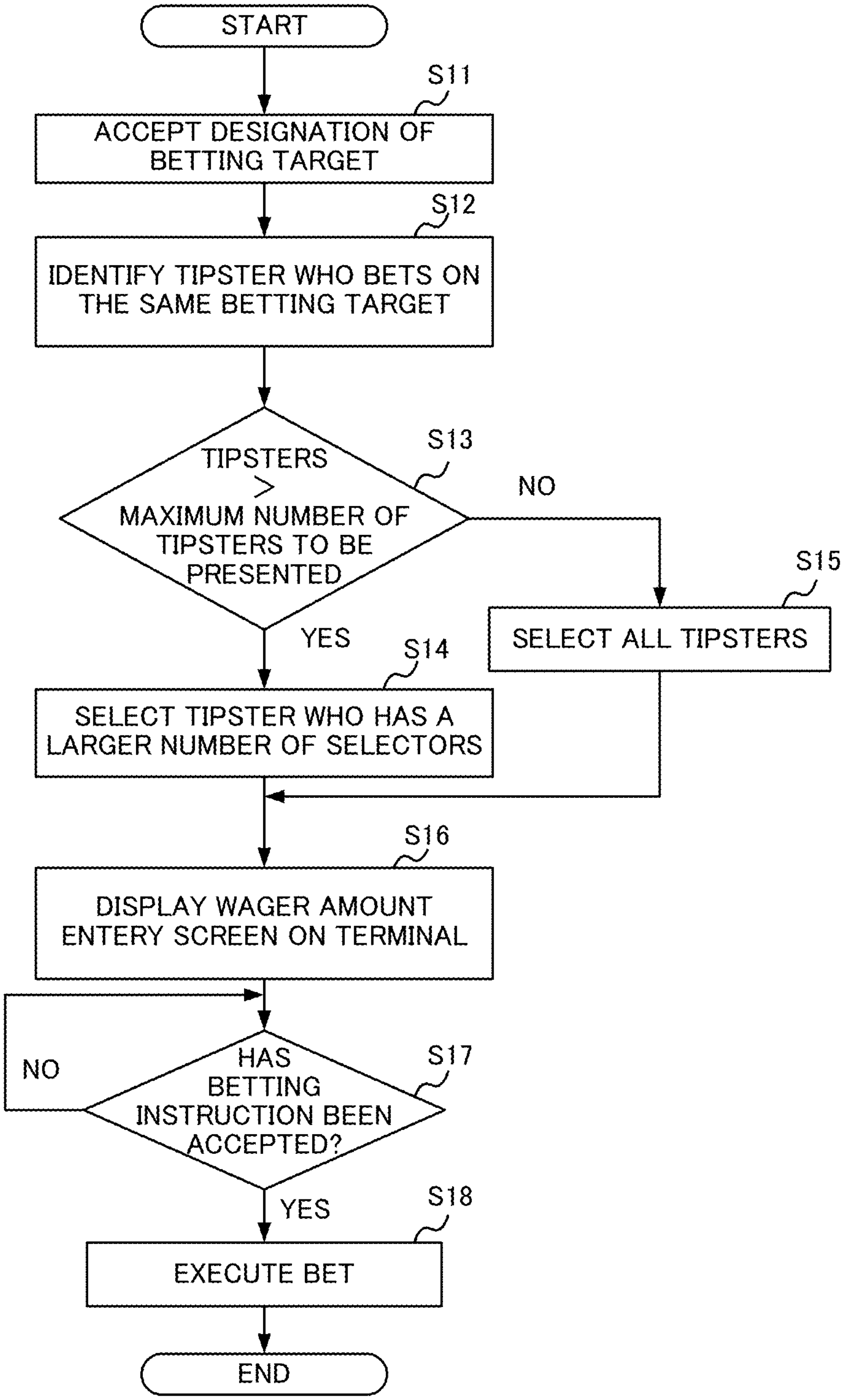
FIG. 10 is a flowchart showing processing of the information processing apparatus.

FIG. 10 is a flowchart showing processing of the information processing apparatus 10. The flowchart shown in FIG. 10 starts from the point in time when the bettor himself/herself designates the betting target on the screen shown in FIG. 6.

First, the accepting part 111 accepts a designation of a betting target for a competition from a bettor (S11). Next, the selecting part 112 references the betting target table, and identifies, among the plurality of tipsters, a tipster who placed a bet on the same betting target as the betting target designated by the bettor (S12).

Next, the selecting part 112 determines whether or not the number of identified tipsters is greater than the maximum number of tipsters to be presented (S13). If the number of identified tipsters is greater than the maximum number of tipsters to be presented, the selecting part 112 shifts the process to S14, and if the number of identified tipsters is less than or equal to the maximum number of tipsters to be presented, the selecting part 112 shifts the process to S15.

In S14, the selecting part 112 references the betting target table, and selects the maximum number of tipsters to be presented who each have a larger number of selectors, i.e., a larger number of bettors who placed the bandwagon bets. In S15, the selecting part 112 selects all the tipsters identified in S12. The display control part 113 causes the terminal 20 of the bettor to display a wager amount entry screen including information indicating the tipsters selected by the selecting part 112 (S16).

Next, the betting part 114 determines whether or not a betting instruction has been accepted from the terminal 20 (S17). If it is determined that the betting instruction has been accepted, the betting part 114 shifts the process to S18, and if it is determined that the betting instruction has not been accepted, the betting part 114 re-executes S17. Next, the betting part 114 executes a bet on the basis of the accepted betting instruction (S18).

<Effect of the Betting System 1>

As described above, in the information processing apparatus 10, the accepting part 111 accepts the designation of the betting target for the competition from the bettor. The selecting part 112 selects, from among the plurality of tipsters who predict outcomes of competitions, a tipster who placed a bet on the same betting target as the betting target designated by the bettor. The display control part 113 causes the selecting part 112 to display the information indicating the tipster on the terminal 20. By operating in this manner, the information processing apparatus 10 can encourage the bettor to place a bet.

The present disclosure is explained on the basis of the exemplary embodiments. The technical scope of the present disclosure is not limited to the scope explained in the above embodiments and it is possible to make various changes and modifications within the scope of the invention. For example, the information processing apparatus 10 accepts the bet in the competition in which contestants move in a competition field, but it is not limited to this. For example, the information processing apparatus 10 may accept a bet placed on (i) a player participating in e-sports such as a competitive game or (ii) a character operated by the player in a competitive game. In this case, when the player or character whom the bet is placed on by the bettor wins, it is assumed that the bet is a win.

Also, for example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

In addition to the above-described embodiments, the followings configurations are additionally described.

APPENDIX 1

An information processing apparatus that accepts a bet for a competition in which a bet can be placed on a betting target, the information processing apparatus includes an accepting part that accepts a designation of a betting target for the competition from a first player;

a selecting part that selects a second player who places a bet on the same betting target as the betting target designated by the first player from among a plurality of second players who predict outcomes of the competition; and a display control part that causes a terminal of the first player to display information indicating the second player selected by the selecting part. Since the information processing apparatus is configured in this manner, it can have the bettor perceive that the tipster is betting on the betting target designated by the bettor, and make the bettor feel confident about his/her own prediction, and thus encourage the bettor to place a bet.

APPENDIX 2

The information processing apparatus according to Appendix 1, wherein the betting target accepted by the accepting part includes a first betting target and a second betting target, and the selecting part selects a betting target on the basis of a predetermined condition from the first betting target and the second betting target, and selects a second player who placed a bet on the same betting target as the selected betting target. Since the information processing apparatus is configured in this manner, it can have the bettor perceive that the tipster has placed a bet on a betting target that satisfies the predetermined condition among a plurality of betting targets designated by the bettor, and can make the bettor feel confident about oneself.

APPENDIX 3

The information processing apparatus according to Appendix 2, wherein the selecting part selects a betting target with higher odds or a betting target with a larger bet amount of the first player from among the first betting target and the second betting target. Since the information processing apparatus is configured in this manner, the bettor can recognize that there is a tipster who placed a bet on the betting target which the bettor puts high importance on, and thus the bettor can place his/her bet at ease.

APPENDIX 4

The information processing apparatus according to any one of Appendixes 1 to 3, wherein the display control part displays a wager amount of the second player on the terminal of the first player together with information indicating the second player. Since the information processing apparatus is configured in this manner, the bettor can understand how confident the tipster is, and thus it is easier for the bettor to use the tipster's prediction as a reference when the bettor places a bet.

APPENDIX 5

The information processing apparatus according to any one of Appendixes 1 to 4, wherein if there are a plurality of second players who placed bets on the same betting target as the betting target designated by the first player, the selecting part prioritizes and selects (i) a second player with a larger number of other players who placed bets on the basis of the bet of the second player over (ii) a second player with a smaller number of other players who placed the bets on the basis of the bet of the second player. Since the information processing apparatus is configured in this manner, it can have the bettor perceive that his/her betting contents match the betting contents of the tipster supported by many users, and can make the bettor feel confident about oneself.

APPENDIX 6

The information processing apparatus according to any one of Appendixes 1 to 5, wherein the selecting part selects, from among the second players who placed bets on the same betting target as the betting target designated by the first player, a second player for whom the number of other players who place bets on the basis of the bet of the second player is equal to or more than a predetermined number. Since the information processing apparatus is configured in this manner, it can have the bettor perceive that his/her betting contents match the betting contents of the tipster supported by many users, and can make the bettor feel confident about oneself.

APPENDIX 7

The information processing apparatus according to any one of Appendixes 1 to 6, wherein if there are a plurality of second players who placed bets on the same betting target as the betting target designated by the first player, the selecting part prioritizes and selects a second player with a better win rate record over a second player with a poorer win rate record. Since the information processing apparatus is configured in this manner, it can have the bettor perceive that his/her betting contents match the betting contents of the tipster with a high win rate, and can make the bettor feel confident about oneself.

APPENDIX 8

The information processing apparatus according to any one of Appendixes 1 to 7, wherein if there are a plurality of second players who placed bets on the same betting target as the betting target designated by the first player, the selecting part prioritizes and selects (i) a second player with a larger number of other players viewing information about a prediction of the second player over (ii) a second player with a smaller number of other players viewing the information about the prediction of the second player. Since the information processing apparatus is configured in this manner, it can have the bettor perceive that his/her betting contents match the betting contents of the popular tipster, and can make the bettor feel confident about oneself.

APPENDIX 9

An information processing method that is executed by a computer which accepts a bet for a competition in which a bet can be placed on a betting target, comprising the steps of: accepting a designation of a betting target for the competition from the first player; selecting a second player who places a bet on the same betting target as the betting target designated by the first player from among a plurality of second players who predict outcomes of the competition;

and displaying information indicating the selected second player on a terminal of the first player. Executing such an information processing method can have the bettor perceive that the tipster is betting on the betting target designated by the bettor, and make the bettor feel confident about his/her own prediction, and thus encourage the bettor to place a bet.

APPENDIX 10

A program that causes a computer, which accepts a bet for a competition in which a bet can be placed on a betting target, to function: an accepting part that accepts a designation of a betting target for the competition from a first player; a selecting part that selects a second player who places a bet on the same betting target as the betting target designated by the first player from among a plurality of second players who predict outcomes of the competition; and a display control part that causes a terminal of the first player to display information indicating the second player selected by the selecting part. Execution of such a program by the processor can make the bettor perceive that the tipster is betting on the betting target designated by the bettor, and make the bettor feel confident about his/her own prediction, and thus encourage the bettor to place a bet.

What is claimed is:

1. An information processing apparatus which accepts a bet for a competition in which a bet is able to be placed on a betting target, the information processing apparatus comprising:

a processor and a storage part, the processor configured to execute a process including:

accepting a designation of the betting target for the competition from a first player;

selecting a second player who places a bet on the same betting target as the betting target designated by the first player from among a plurality of second players who predict outcomes of the competition; and displaying information indicating the second player selected in the selecting on a terminal of the first player, wherein the betting target accepted in the accepting includes a first betting target and a second betting target, and the selecting includes selecting a betting target on the basis of a predetermined condition from the first betting target and the second betting target, and selecting the second player who placed a bet on the same betting target as the selected betting target, the selecting includes selecting a betting target with higher odds or a betting target with a larger bet amount of the first player from among the first betting target and the second betting target, the betting target comprises a betting target table, the betting target table comprising (i) names of a plurality of tipsters, (ii) betting types, (iii) betting targets bet on by the plurality of tipsters, (iv) the number of bettors selecting each predicted betting target, and (v) the number of bettors watching a video streamed by the plurality of tipsters, are associated with each other, the storage part is configured to store a result table including information in which (i) the plurality of tipsters who placed bets on a competition and (ii) win rate records of the respective tipsters are associated with each other, and in response to more tipsters betting on the same betting target as the betting target designated by the bettor than the maximum number of tipsters to be presented, the selecting part selects, from among these tipsters, the maximum number of tipsters to be presented who each have a win rate result, by referencing the result table, and the win rate result based on the bets of the tipsters made on the same betting target as the betting target designated by the bettor, the selecting part being able to select a tipster with a better win rate record over a tipster with a poorer win rate record, and the result table displaying the win rate in descending order.

2. The information processing apparatus according to claim 1, wherein the displaying includes displaying a wager amount of the second player on the terminal of the first player together with information indicating the second player.

3. The information processing apparatus according to claim 1, wherein if there are a plurality of second players who placed bets on the same betting target as the betting target designated by the first player, the selecting includes prioritizing and selecting a second player with a better win rate record over a second player with a poorer win rate record.

4. The information processing apparatus according to claim 1, wherein the displaying includes displaying, on one screen of the terminal of the first player, a plurality of the betting targets and one or more of the second players who placed bets on at least one of the plurality of betting targets.

5. An information processing apparatus which accepts a bet for a competition in which a bet is able to be placed on a betting target, the information processing apparatus comprising a processor and a storage part, the processor configured to execute a process including:

accepting a designation of a betting target for the competition from a first player;

selecting a second player who places a bet on the same betting target as the betting target designated by the first player from among a plurality of second players who predict outcomes of the competition; and displaying information indicating the second player selected in the selecting on a terminal of the first player, wherein if there are a plurality of second players who placed bets on the same betting target as the betting target designated by the first player, the selecting includes prioritizing and selecting (i) a second player with a larger number of other players who placed bets on the basis of the bet of the second player over (ii) a second player with a smaller number of other players who placed the bets on the basis of the bet of the second player, the betting target comprises a betting target table, the betting target table comprising (i) names of a plurality of tipsters, (ii) betting types, (iii) betting targets bet on by the plurality of tipsters, (iv) the number of bettors selecting each predicted betting target, and (v) the number of bettors watching a video streamed by the plurality of tipsters, are associated with each other, the storage part is configured to store a result table including information in which (i) the plurality of tipsters who placed bets on a competition and (ii) win rate records of the respective tipsters are associated with each other, and in response to more tipsters betting on the same betting target as the betting target designated by the bettor than the maximum number of tipsters to be presented, the selecting part selects, from among these tipsters, the maximum number of tipsters to be presented who each have a win rate result, by referencing the result table, and the win rate result based on the bets of the tipsters made on the same betting target as the betting target designated by the bettor, the selecting part being able to select a tipster with a better win rate record over a tipster with a poorer win rate record, and the result table displaying the win rate in descending order.

6. An information processing apparatus which accepts a bet for a competition in which a bet is able to be placed on a betting target, the information processing apparatus comprising a processor and a storage part, the processor configured to execute a process including:

accepting a designation of a betting target for the competition from a first player;

selecting a second player who places a bet on the same betting target as the betting target designated by the first player from among a plurality of second players who predict outcomes of the competition; and displaying information indicating the second player selected in the selecting on a terminal of the first player, wherein the selecting includes selecting, among the second players who placed bets on the same betting target as the betting target designated by the first player, a second player for whom the number of other players who placed bets on the basis of the bet of the second player is equal to or more than a predetermined number, the betting target comprises a betting target table, the betting target table comprising (i) names of a plurality of tipsters, (ii) betting types, (iii) betting targets bet on by the plurality of tipsters, (iv) the number of bettors selecting each predicted betting target, and (v) the number of bettors watching a video streamed by the plurality of tipsters, are associated with each other, the storage part is configured to store a result table including information in which (i) the plurality of tipsters who placed bets on a competition and (ii) win rate records of the respective tipsters are associated with each other, and in response to more tipsters betting on the same betting target as the betting target designated by the bettor than the maximum number of tipsters to be presented, the selecting part selects, from among these tipsters, the maximum number of tipsters to be presented who each have a win rate result, by referencing the result table, and the win rate result based on the bets of the tipsters made on the same betting target as the betting target designated by the bettor, the selecting part being able to select a tipster with a better win rate record over a tipster with a poorer win rate record, and the result table displaying the win rate in descending order.

7. An information processing apparatus which accepts a bet for a competition in which a bet is able to be placed on a betting target, the information processing apparatus comprising a processor and a storage part, the processor configured to execute a process including:

accepting a designation of a betting target for the competition from a first player;

selecting a second player who places a bet on the same betting target as the betting target designated by the first player from among a plurality of second players who predict outcomes of the competition; and displaying information indicating the second player selected in the selecting on a terminal of the first player, wherein if there are a plurality of second players who placed bets on the same betting target as the betting target designated by the first player, the selecting includes prioritizing and selecting (i) a second player with a larger number of other players viewing information about a prediction of the second player over (ii) a second player with a smaller number of other players viewing the information about the prediction of the second player, the betting target comprises a betting target table, the betting target table comprising (i) names of a plurality of tipsters, (ii) betting types, (iii) betting targets bet on by the plurality of tipsters, (iv) the number of bettors selecting each predicted betting target, and (v) the number of bettors watching a video streamed by the plurality of tipsters, are associated with each other, the storage part is configured to store a result table including information in which (i) the plurality of tipsters who placed bets on a competition and (ii) win rate records of the respective tipsters are associated with each other, and in response to more tipsters betting on the same betting target as the betting target designated by the bettor than the maximum number of tipsters to be presented, the selecting part selects, from among these tipsters, the maximum number of tipsters to be presented who each have a win rate result, by referencing the result table, and the win rate result based on the bets of the tipsters made on the same betting target as the betting target designated by the bettor, the selecting part being able to select a tipster with a better win rate record over a tipster with a poorer win rate record, and the result table displaying the win rate in descending order.

8. The information processing apparatus according to claim 7, wherein if there are more than a predetermined maximum number of the second players who placed bets on the same betting target as the betting target designated by the first player, the selecting includes selecting less than or equal to the maximum number of the second players with a relatively larger number of other players viewing information about a prediction of the second player.

* * * * *